Patented July 10, 1951

2,559,985

UNITED STATES PATENT OFFICE 2,559,985

PROCESS FOR AIR-BLOWING CLAY TOWER POLYMER

Lloyd C. Morris, Bartlesville, Okla., assignor to Phillips Petroleum Company, a corporation of Delaware No Drawing. Application December 10, 1945, Serial No. 634,154

2 Claims. (Cl. 260—82)

This invention relates to a process for treating high boiling petroleum polymers to increase the content of resins solids therein. More particularly, it relates to a process for treating polymers such as those produced in clay treating cracked hydrocarbon streams or by similar treatment in such a manner that the yield of high melting resin obtained on distillation of the lower boiling fractions is markedly increased.

The characteristic high boiling olefin polymer produced in the clay treating of cracked hydrocarbon distillates which is also called "clay tower" polymer, has long been known, and for many years was considered of no value, except for fuel, and presented in many cases difficult disposal problems. More recently this polymer has been found to have "drying" properties and has found limited usefulness as a constituent of surface coatings, sand core molding compositions and the like where this property is important. Another potentially very important use for the material is in the manufacture of "solid resins," which are the relatively high melting resins remaining when the lighter fractions of the polymer are distilled off and removed. These resins resemble dark wood rosin in some respects and are used as ingredients of varnishes and coating materials of various types in a similar manner, and for other purposes. They form an ingredient of important coatings used for weather proofing tents, etc., to be used in moist, hot, tropical climates, and are of considerable importance for this use. These resins are characterized by their high melting point of 150° F. or above, by the complete solubility in hydrocarbon solvents such as octane, and by the essentially zero acid number (less than 1 mg. KOH per gram of resin). These properties distinguish the material clearly from asphalts, which are not totally hydrocarbon soluble on the one hand and from rosins, which have high acid numbers on the other. The hydrocarbon polymers treated in accordance with the present invention are produced in a manner well known to the prior art; more particularly, the polymers are obtained by contact of cracked hydrocarbons with solid contact materials such as fuller's earth or other active clays at temperatures of 150–650° F. The polymers are then separated from the treated hydrocarbon material by distillation. Polymers obtained by treatment of cracked hydrocarbons with other contact materials such as silica gel or dilute sulfuric acid may also be treated in the manner described herein to obtain improved yields of solid resin. The cracked hydrocarbon may be produced by thermal or catalytic cracking or polyforming of petroleum fractions, such as gas oils, naphthas and gasolines.

Heretofore it has been the practice to prepare the resin by simple "reduction," that is, distillation of the polymer. The yield and quality of the resin produced has been almost entirely dependent upon the quality of the sample of polymer charged to the process. The quality of the polymer depends largely upon the hydrocarbon feed being processed and the conditions maintained in the polymer. Since the polymers are generally produced as by-products in large scale petroleum processing operations and are secondary thereto, clay tower conditions are regulated to meet the needs of these operations regardless of the quantity and type of polymer produced. The yield of the desired solid resin is therefore almost wholly beyond control. Excessive temperatures which result in cracking of some of the product may be avoided of course. When resin which meets the usual specifications with respect to softening point, iodine number, acid number, etc., is produced, the yield has been substantially determined by the polymer charge used. The widespread interest which has been aroused in this resin has created a demand which is difficult if not impossible to meet with available polymer supplies, and a method for increasing the production of resin therefrom has been needed.

It is an object of the present invention to provide a process for obtaining increased yields of solid resins from high boiling petroleum polymers. It is another object of the present invention to increase the yield of solid polymers from clay treated cracked hydrocarbons, such as naphthas and gasolines. Further objects of the invention will be apparent from the herein contained description.

We have now found a method by which we are able to increase the yield of specification grade resin produced from a given sample by as much as ten or even twenty per cent. We accomplish this increase in yield by a process of blowing oxygen or oxygen-containing gas through the polymer at elevated temperature for a period of time prior to or during the distillation to resin. The resin produced is substantially the same as produced in the ordinary processes of the prior art. Minor variations in properties may occur but these are within the rather narrow limits set up in the specifications which characterize the product.

In its more specific embodiment, my process comprises heating the polymer to an elevated temperature, generally in the range of about 300 to 500° F., while passing a stream of gas containing oxygen through the liquid. Good agitation is maintained meanwhile, either by means of the gas stream or by mechanical means. The gas rate is adjusted to give the maximum degree of increase in resin in periods of about three to six hours generally, although shorter or longer periods may be used. Generally I prefer to maintain conditions in the apparatus, which may be a still or any suitable heated vessel, whereby the liquid which distills from the polymer is continuously refluxed to the reactor. After a suitable period of oxygen treatment, the blown polymer is placed in a still, and "reduced" under vacuum conditions to the desired solid resin.

The gas which I use in my process may be any one containing oxygen, and may vary from a very dilute stream to pure oxygen. Generally I prefer to use concentrations of from about five to about 30 per cent oxygen, and in most cases ordinary air is very satisfactory. Synthetic mixtures of oxygen with other inert gases such as carbon dioxide may be used. The gas rate employed may be varied over some considerable range, as may the time of treatment, and the two are generally interrelated so that a shorter time of treatment is required at a higher gas rate. Rates of about 14 cubic feet of air per hour per gallon of polymer are commonly used, and values from 10 to 25 cu. ft./gal. per hour are often used, when air or its equivalent in oxygen content is used for treating periods of the usual lengths of about 2 to 6 hours. This rate of flow is equivalent to a value of from about 2 to about 5 cubic feet of pure oxygen per gallon per hour.

The temperature of treatment is generally found to be most satisfactory when in the range of 300 to 400° F. The treatment is more rapid at higher temperatures of course, but at values above 500° F. destructive cracking may set in and these levels are avoided. At temperatures below 200° F., treatment by the oxygen bearing gas becomes so slow as to be impractical. The levels of 200 to 300° F. are most satisfactorily employed when pure oxygen is used as the gas, and 300 to 400° F. is more often used with air.

By means of my process, I am able to increase the yields of solid resin from 5 to as much as 20 per cent. Thus, in a typical case in which the yield of resin from the original polymer is 40 per cent, after air blowing by my process, I obtain from 44 to as high as even 48 per cent yield from the same polymer, and the resin produced is in every respect tested satisfactory and equivalent to that produced without air blowing. This increased yield is of great importance in augmenting the available supply of the valuable resin. The overhead product distilled from the polymer is ordinarily a loss, since it has no important uses. The loss of material and the disposal problem is also markedly reduced by the corresponding reduction in quantity of this light material when the solid resin yield is increased.

I may also modify my process to conduct the air blowing process during the distillation step and to utilize the air current to carry off the overhead vapors instead of the usual vacuum distillation.

One very successful modification of my process comprises adding a siccative agent to the polymer in minor proportion during the treatment to improve the utilization of the oxygen in the stream. Thus, addition of about one per cent of iron naphthenate may result in an increase in yield of about 12 per cent under conditions of air blowing which gave an increased yield of only about 9 per cent when treated under the same conditions without it. Other agents which we may use comprise other heavy metal naphthenates, such as copper naphthenates and oxidized petroleum distillates, such as those containing peroxides and the like.

Example I

A sample of clay tower polymer resulting from treatment of a vapor phase thermally cracked naphtha stream with fuller's earth at 360° F. was subjected to reduction by vacuum distillation to solid 150° F. softening point resin. The yield of resin recovered was 40.2 per cent by weight of the original polymer. The polymer charge had a gravity of 0.959 at 60° F., and iodine number by the Wijs method of 203. The resin produced had a softening point of 153° F., iodine number of 207, acid number of zero and was completely hydrocarbon soluble.

A portion of this same clay tower polymer was subjected to blowing with a stream of air at the rate of 14.5 cu. ft. of air per gallon of polymer per hour. The polymer was maintained at 300° F. in a vessel vented to the atmosphere, and was thoroughly agitated by the air stream. Treatment was continued for a period of three hours. After this time the remaining light polymer was removed by vacuum distillation in the normal manner. A yield of resin was recovered equal to 45.0 per cent of the weight of the original polymer, representing an increase in yield of 12 per cent. The resin recovered had a softening point of 150° F., iodine number of 214, acid number of 0.4 mgm. KOH per gram of polymer, and was completely hydrocarbon soluble. In use in weather proofing coatings on canvas its properties and behavior were indistinguishable from the resin produced without air blowing.

Example II

Samples of the clay tower polymer of Example I were subjected to air blowing using varied temperatures, air rates, and length of treatment. They were subsequently reduced to solid resin of 150 softening point and the yield determined. The air treatments were carried out with good agitation and were made in a still in which the lighter components which vaporized in the air stream were continuously refluxed and returned to the still. In one test, no air was passed through the liquid, but it was agitated mechanically during the thermal digestion.

In the following tabulation the conditions of treatment and the yields of resin obtained in the various tests are shown. The percentage increase in yield compared to the 40.2% yield obtained on untreated polymer in Example I is indicated:

| Air Rate | Temperature | Time of Treatment | Yield of 150° F. resin | Increase in Yield |
|---|---|---|---|---|
| Cu. ft. per gal. per hr. | °F. | Hours | Weight, per cent | Per cent |
| None | 480 | 3 | 41.8 | 4 |
| 14.5 | 300 | 3 | 43.8 | 9 |
| 14.5 | 300 | 6 | 47.7 | 18.5 |
| 22 | 400 | 4 | 47.8 | 19 |

The resins produced after these treatments all had softening points of over 150° F., acid numbers below 1 and iodine numbers of 200 to 220. They were all completely hydrocarbon soluble and satisfactory in use.

The improvement obtained in the thermal treatment at the maximum temperature possible without cracking was less than half that in the mildest oxygen treatment.

*Example III*

A sample of the clay tower polymer of Example I was subjected to air blowing in the apparatus and manner as described in Example II, using one per cent of iron naphthenate in the polymer during the treatment, which was for 3 hours at 300° F. with a rate of 14.5 cu. ft. of air per gallon per hour. After reduction, a yield of 45.0 per cent of resin melting at 155° was obtained. The increase in yield obtained over untreated polymer was thus 12 per cent. The acid number of the resin was 0.6 and the iodine number 221. It was entirely soluble in n-octane.

I claim:

1. A method for obtaining solid resinous material from hydrocarbon polymers formed in the refining of cracking petroleum distillates with solid contact materials at elevated temperatures, said polymers having an iodine number of 203 and a specific gravity of 0.959 at 60° F., which comprises contacting said hydrocarbon polymers with air for a period of 3 to 6 hours while maintaining a temperature within the range of 300° to 480° F. and a flow rate of air of 14.5 to 22 cubic feet per gallon of polymer per hour to obtain a solid hydrocarbon soluble resin having an acid number within the range of 0.4 to 0.6 milligram of potassium hydroxide per gram of polymer, an iodine number of 214 to 221, and a softening point of 150 to 155° F.

2. A process in accordance with claim 1 in which 1 per cent of iron naphthanate is introduced into the reaction zone during the air treatment.

LLOYD C. MORRIS.

REFERENCES CITED

The following references are of record in the file of this patent:

UNITED STATES PATENTS

| Number | Name | Date |
| --- | --- | --- |
| 1,627,054 | Morrell | May 3, 1927 |
| 1,888,044 | Morrell | Nov. 15, 1932 |
| 1,965,191 | Hyman | July 3, 1934 |